United States Patent [19]

Davidson et al.

[11] Patent Number: 4,748,087

[45] Date of Patent: May 31, 1988

[54] PLASTIC LAMINATE OF FURNITURE FOIL AND METHOD OF MAKING

[75] Inventors: Robert S. Davidson, Leicester; Richard J. Ellis, Milton Keynes, both of England

[73] Assignee: The Wiggins Teape Group Limited, Hampshire, England

[21] Appl. No.: 102,266

[22] Filed: Sep. 25, 1987

Related U.S. Application Data

[63] Continuation of Ser. No. 946,140, Dec. 24, 1986, abandoned, which is a continuation of Ser. No. 770,193, Aug. 28, 1985, abandoned.

[30] Foreign Application Priority Data

Jun. 8, 1984 [GB] United Kingdom ............... 8414705

[51] Int. Cl.$^4$ ..................... B32B 15/08; B05D 3/06
[52] U.S. Cl. ..................... 428/463; 427/44; 427/54.1; 427/385.5; 427/388.2; 427/391; 427/393; 428/461; 428/514; 428/522
[58] Field of Search ............ 427/44, 54.1, 385.5, 427/388.2, 391, 393; 428/461, 463, 514, 522

[56] References Cited

U.S. PATENT DOCUMENTS

| | | | |
|---|---|---|---|
| 3,398,210 | 8/1968 | Plueddemann et al. | 427/44 X |
| 4,084,021 | 4/1978 | Sandvig | 427/44 |
| 4,303,485 | 12/1981 | Levens | 427/44 X |
| 4,332,879 | 6/1982 | Pastor et al. | 427/44 X |
| 4,435,461 | 3/1984 | Gray, III et al. | 427/44 X |

FOREIGN PATENT DOCUMENTS

| | | |
|---|---|---|
| 0090556 | 10/1983 | European Pat. Off. . |
| 0600721 | 4/1948 | United Kingdom . |
| 0600722 | 4/1948 | United Kingdom . |
| 0733224 | 7/1955 | United Kingdom . |
| 1153813 | 5/1969 | United Kingdom . |
| 1369808 | 10/1974 | United Kingdom . |
| 1470723 | 4/1977 | United Kingdom . |
| 1506921 | 4/1978 | United Kingdom . |
| 1525418 | 9/1978 | United Kingdom . |
| 2089826 | 6/1982 | United Kingdom . |

*Primary Examiner*—Thurman K. Page
*Attorney, Agent, or Firm*—Burns, Doane, Swecker & Mathis

[57] ABSTRACT

Cured coatings on substrates especially sheet substrates like paper are produced by electron beam irradiation of curable compositions comprising organic substituted tin silicon, titanium and zirconium compounds in which the organic radicals include crotonate or, especially, acrylate residues. The inclusion of the metal compounds gives coatings which cure rapidly at low electron beam doses to give cured coatings having good solvent and abrasion resistance properties. Coated substrates produced find use in plastic laminates, furniture foils and similar products.

12 Claims, No Drawings

PLASTIC LAMINATE OF FURNITURE FOIL AND METHOD OF MAKING

This application is a continuation of application Ser. No. 946,140 filed Dec. 24, 1986, which is a continuation of application Ser. No. 770,193 filed Aug. 28, 1985 both now abandoned.

CROSS REFERENCE TO RELATED APPLICATION

This application is a continuation of PCT/GB85/00250, which was filed June 7, 1985, designating the United States as a recipient.

The present invention relates to a method of making substrates and in particular sheet substrates carrying a cured polymeric coating in which the coating is cured using electron beam radiation.

Cured polymeric coatings on sheet substrates such as sheet metal, metal foils, plastic sheets and films and paper can be provided by coating the substrate with a "thermosetting" polymer composition i.e. one which cures in or as a result of the coating operation or by coating the substrate with a curable composition which is subsequently cured. In the latter case, the curing can be effected by chemical crosslinking, thermal curing or radiation induced curing. The present invention relates to this last named technique and specifically to curing coatings by exposure to electron beam (EB) radiation. In EB curing of polymers, the elctrons are believed to generate radical ions by ionization or cause bond rupture to give free radicals and these reactive species effect cross-linking reactions within the coating composition. The provision of cured polymeric coatings is conventionally typically used to provide pigmented e.g. paint, or unpigmented e.g. lacquer or over-lacquer, coatings especially on metal substrates, varnishes or non metallic e.g. paper, wood and plastic sheet or film, substrates, functional coatings e.g. as sealants, fillers, release surfaces, adhesives or wear resistant coatings on metallic or non-metallic substrates, as components of laminates or as inks. It is an advantage of EB curing that the presence of high pigment concentrations does not substantially reduce the rate of cure.

The present invention is based on the discovery that a range of metal-organic compounds and, in particular organometallic acrylates, can be used in coating compositions to give a high rate of curing when exposed to EB radiation to give cured coatings having good flexibility, toughness and scratch resistance. The compounds are alkyl and/or aryl and/or acrylate or crotonate compounds of tin, silicon, titanium, zirconium.

Accordingly, the present invention provides a method of making a substrate in particular a sheet substrate having on at least one surface thereof a cured polymeric coating, which method comprises providing on the substrate a layer of a curable coating composition including at least one compound of the formula:

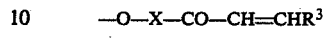   (I)

where
each $R^1$ is independently an alkyl group, particularly one containing from 1 to 20, especially 3 to 12, carbon atoms optionally substituted with one or more alkoxy, especially $C_1$ to $C_4$ alkoxy or polyoxyalkylene, especially di or trioxyethylene, groups; an alkenyl group, particularly a $C_2$ to $C_{10}$ and especially a $C_2$ to $C_4$ e.g. a vinyl, group; a cycloalkyl group, particularly a $C_5$ to $C_7$ and especially a cyclohexyl, group; an aralkyl group, particularly a $C_7$ to $C_{12}$ aralkyl, expecially a benzyl, phenylethyl, or diphenylmethyl group; or an aryl group, particularly a phenyl or naphthyl group which is optionally substituted with one or more alkyl, especially $C_1$ to $C_5$, or alkoxy, especially $C_1$ to $C_5$ alkoxy, groups or halogen, especially chlorine, atoms;

each $R^2$ is independently a group of the formula:

$$-O-X-CO-CH=CHR^3$$

where
X is a direct bond;
a group of the formula: $-(CH_2CHR^4O)_p-$, where $R^4$ is a $C_1$ to $C_4$, especially $C_1$ alkyl group, or, and preferably, a hydrogen atom, and p is an integer from 1 to 3, preferably 1;
a $C_2$ to $C_{16}$, especially a $C_2$ to $C_8$, alkylene group;
a group of the formula: $-[(CH_2)_rCO_2]_s-(CH_2CHR^4O)_p-$, where $R^4$ and p are as defined above, r is an integer from 3 to 8, particularly 4 or 5, and s is an integer from 1 to 3, especially 2;
$R^3$ is a methyl group or, and preferably, a hydrogen atom;
n is an integer from 1 to 4, especially 2 or 3;
m is (4−n); and
M is a $Ti-(O-)_m$, $Zr-(O-)_m$ or $Si-(0)_m$ group or, and preferably, a tin or silicon atom; and
curing the coating by exposing it to electron beam radiation.

We have obtained best results with compounds in which M is a tin or silicon atom. For such tin and silicon compounds we have found that particular sub-groups of compounds of the general formula (I) are particularly effective and the invention includes as specific aspects the use of these sub-groups of compounds.

Accordingly, the invention includes a method of making a substrate in particular a sheet substrate having on at least one surface thereof a cured polymeric coating, which method comprises providing on the substrate a layer of a curable coating composition including at least one tin compound of the formula:

   (Ia)

where $R^1$, m and n are as defined above, and curing the coating by exposing it to electron beam radiation.

Further, the invention includes a method of making a substrate in particular a sheet substrate having on at least one surface thereof a cured polymeric coating, which method comprises providing on the substrate a layer of a curable coating composition including at least one silicon compound of the formula:

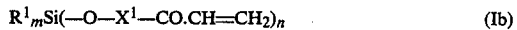   (Ib)

where $R^1$, m and n are as defined above, and $X^1$ is X as defined above but is not a direct bond;
and curing the coating by exposing it to electrom beam radiation.

The particular choice of a compound or mixture of compounds of the general formula (I) above for use in the method of the invention will depend on a number of factors including the end use of or properties desired in the cured coated substrate product. We have found that generally the reactivity towards curing by EB irradiation is better when M is Sn than when M is Si or Si-$-(O-)_m$ which is better than when M is Ti-$-(O-)_n$ or $Zr-(O-)_m$. Generally, the most reactive compounds are those where $R^3$ is hydrogen. The activity of the compounds is generally higher with larger values of n but compounds where n is 3 or 4 and $R^2$ is a $O_2C.CH:CH_2$ group tend to be solids which may be difficult to formulate into a coatable composition. Ways of avoiding or overcoming this difficulty are mentioned below. Within the definition of $R^1$ we have obtained good results where $R^1$ is an alkyl, and in particular a $C_3$ to $C_{12}$ alkyl, group. The use of relatively long chain, say $C_8$ and above, alkyl groups tends to lead to slightly reduced activity on curing corresponding to the increase in molecular weight (for a given functionality). However, the use of such long chain alkyl groups can improve the ease of incorporation of the compounds into a coating mix including other polymerizable materials, and this can be a significant and practical advantage.

Reference is made above to possible difficulties in formulating coating mixes including other constituents especially polymerizable materials. The most common cause of such difficulties is that the compound of the formula (I) is a solid at ambient and moderately superambient temperatures e.g. up to 50° C. This happens particularly where n is 3 or especially 4 and when the $R^2$ groups have X as a direct bond. In some cases this difficulty can be overcome by choice of a suitable reactive monomer or oligomer to act as a solvent for the compound(s) of the formula (I) and/or by formulating, and if necessary coating and curing at elevated temperatures although the cost and inconvenience of heating make it desirable to avoid this in large scale operation. Alternatively, the problem can be mitigated or avoided by using a mixture of compounds of the formula (I) thus taking advantage of the entropy of mixing. However, even when liquids, some of the compounds of the formula (I) are not or not readily miscible e.g. di-n-butyltin diacrylate and di-n-butyltin di-crotonate. We have found that this can be overcome by synthesising compounds with mixed groups $R^2$ (when n is at least 2) in particular where one of the $R^2$ groups is a $O_2C.CH:CH_2$ group. An example of such a material, corresponding to the immiscible pair mentioned above, is di-n-butyltin acrylate crotonate. The synthetic route we have used for such materials involves using a mixture of compounds of the formula H—O—X—OC.CH:CHR³ where X and $R^3$ are as defined above for the general formula (I) as a starting material so that the final product has the desired overall composition. Accordingly we believe that, impurities apart, this product or 'compound of the formula (I)' is a statistical mixture of the various possible products. For example, the reaction between one mole of di-n-butyltin oxide and a mixture of one mole of each of acrylic and crotonic acids yields a liquid product which is probably (assuming complete reaction) ca.0.25 moles of di-n-butyltin diacrylate, ca.0.5 moles of di-n-butyltin acrylate crotonate and ca.0.25 moles of di-n-butyltin dicrotonate. Our testing of such products has shown them to appear to react largely as if they are wholly the mixed compound. The particular physical state and properties of such products can be varied by varying the nature and relative amounts of the components of the mixture used as starting materials. Similarly variation in the groups $R^1$ is possible where m is at least 2. The use of compounds with mixed $R^2$ groups tends to give somewhat less reactive coatings than when all the $R^2$ groups are or include acrylate groups and this may need to be offset against the improved formulation characteristics which can be obtained by using them.

The compounds used in the method of this invention can be made by known routes for making such organometallic compounds, metal esters or metallo-organic esters. The following are illustrative of synthetic routes to the esters and ester alkoxides used in the invention.

1. Tin compounds
   (a) by reacting an organotin oxide with a carboxylic acid

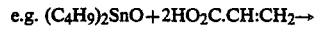

The removal of water can conveniently be achieved by distillation e.g. azeotropically using benzene or toluene as continuous phase in the reaction mixture. This reaction is particularly suitable for making compounds where m=n=2.

(b) by reacting an organotin hydroxide with a carboxylic acid. This is in essence similar to the reaction (a) but involves removal of 1 moles of water per hydroxyl group per mole of tin compound. It is suitable for making compounds where n=1 to 3.

(c) by reacting a tin alkoxide with an hydroxyl compound.

e.g.

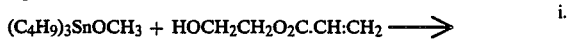

i.

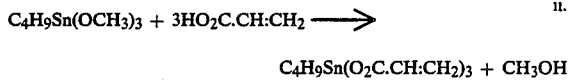

ii.

The alkoxide starting material will usually have short alkyl chains so as to permit removal of alcohol liberated in the reaction by distillation or evaporation (d) by reacting an (organo) tin halide with an hydroxyl compound.

Silicon Compounds
   (a) by reaction an (organo) silicon halide with a hydroxyl compound, e.g.

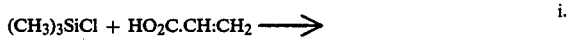

i.

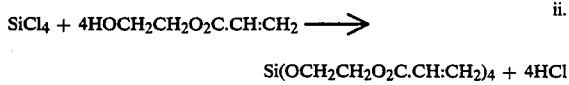

ii.

The reaction is typically carried out in solution in a non-aqueous solvent at a modestly superambient temperature e.g. under reflux in diethyl ether, in the presence of a scavenger e.g. triethylamine, for the HCl generated.

3. Titanium and Zirconium compounds
   (a) by reacting an organo titanate or zirconate with a hydroxyl compound.

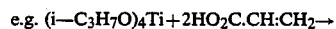

Where the organic group in the starting material is an alkoxy group this is represented in the reaction products as an alcohol. It is convenient that the alcohol can be removed by distillation if it is volatile and, thus, this method is especially suitable for those compounds where the organic group is a relatively short chain e.g. $C_1$ to $C_6$, alkoxy group.

The coating composition used in the invention contains one or more compounds of the formula I as a reactive monomer. Usually the coating compositions will include one or more conventional curable coating resins. These coating resins are usually oligomers containing one or more acrylic or methacrylic residues which can be crosslinked under EB irradiation to form a cured coating. The oligomers can be based on acrylic or methacrylic monomers or can be oligomers of other systems e.g. urethane oligomers or polyesters, which include or have been modified to include the acrylic or methacrylic residues. Some unsaturated polyesters are themselves curable and can be used without addition or inclusion of acrylic or methacrylic residues. Examples of suitable resins include acrylate esters of polyhydric alcohols e.g. trimethylolpropane trimethacrylate, acrylate esters of polyoxyalkylene oligomers e.g. tripropyleneglycol diacrylate, acrylate terminated polyesters e.g. that sold by B.A.S.F. under the description polyester acrylate 55F, acrylated urethane oligomers e.g. that sold by Cray Valley Products Ltd. under the designation Synocure 3131, and acrylated epoxy oligomers e.g. that sold by Cray Valley Products under the designation Synocure 3104.

The coating mix may also include monomeric or low molecular weight polymerizable liquids which can act as solvents or co-solvents for the compound of the formula (I) as is referred to above. Examples of such materials are hexane diol diacrylate and ethylene glycol monoacrylate (E.G.M.A.) also known as 2-hydroxyethyl acrylate which is also useful as an intermediate in making certain compounds of the formula (I). The amount of such a material will depend on its solvent capability and the amount of the compound of the formula (I) used.

The relative proportions of compounds of the formula I and curable resin and/or reactive monomer (when used) will typically be from 5:1 to 1:50 by weight and preferably 1:1 to 1:40. The use of relatively large amounts of curable resin is desirable on economic grounds but the use of lower than indicated proportions of the metal acrylate tends to give results not significantly different from the use of the curable resin on its own. The coating composition may include other components such as pigments e.g. white pigments like titanium dioxide, coloured pigments, black pigments like carbon black, speciality pigments such as $Fe_3O_4$ and dyestuffs. The proportions of these other components depends on the desired product. One important possibility is the use of no significant amount of hiding pigment so as to obtain a clear and preferably transparent and uncoloured, cured coating. This can be used as a protective layer, lacquer or varnish over the substrate so that the surface of the substrate is visible through it. This is especially useful in the production of the visible surface of resin impregnated laminates and of furniture foils.

The substrate used in the invention can be any substrate suitable for coating using EB curing. In particular, this invention is applicable to the coating of sheet substrates especially paper. Other substrates include plastics especially sheet and film, wood, leather, glass and metals, especially sheet metals. The major limitation on the substrate is that it should not be unduly damaged by exposure to the EB radiation.

The amount of coating applied to the substrate will largely be determined by the intended end use of the cured coated substrate. However, for sheet substrates the coatweight is likely to be in the range of 1 to 100 $gm^{-2}$ of coating mix prior to curing. In the manufacture of paper based products, the coatweight will vary depending on the amount of pigment used. For coatings containing little or no pigment the coatweight will typically be from 2 to 15 $gm^{-2}$. However if the paper substrate is printed and is coated to provide a part of a laminate coatweights up to 50 $gm^{-2}$ might be used. When the coating is pigmented a proportion, and often the bulk, of the coatweight is pigment. Where the product is intended to be paperlike, pigmented coatweights will typically be from 5 to 40 $gm^{-2}$ but for products for plastic laminates, coatweights can be higher e.g. up to 80 $gm^{-2}$. Where the substrate is other than paper the coating can be a thin lacquer e.g. 5 to 10 $gm^{-2}$ or a thicker varnish or paint which can be up to 100 $gm^{-2}$, for metal substrates coatweights from 30 to 80 $gm^{-2}$ can be common. Higher gross coatweights can be achieved by multiple coating steps, provided with repeated exposure to EB radiation does not unduly damage the substrate. Similarly both sides of sheet substrates can be coated if desired. Also multiple coating layers may be cured in a signle pass by use of appropriate application techniques. Further coatings, above or below the EB cured coatings produced by the present invention, can be provided if desired and such further coatings can be provided by other techniques e.g. UV or thermal curing, solvent coating etc. as appropriate to the product. To date we have not observed any dependence of the dose needed to cure a coating on coatweight, although we have not specifically investigated any dose-coatweight relationship. Further, the standard measurements of dose are in effect measures of the output of the radiation source rather than the actual dose absorbed by the coating being cured. The method and equipment used to irradiate the coated substrate with EB radiation can be conventional. The EB unit can be single or multi-cathode or may use a scanning beam. Particular designs are favoured by individual equipment manufacturers and we have not observed any significant differences on rate of cure or properties of cured coatings as between the EB equipment of different manufacturers. Typically the voltage of the electron beam will be from 50 to 300 kV, especially about 150 kV. The beam current will usually be varied so as to provide the desired dose. As is usual the EB curing zone will normally be blanketed by a gas, typically nitrogen, to exclude oxygen, which would result in a marked reduction in beam intensity and/or quenching or inhibition of the curing reaction.

The following Examples illustrate the invention. All parts and percentages are by weight unless otherwise indicated.

Example S1 to S67 are synthesis Examples which describe the preparation of and some physical properties of compounds used in the invention. Examples S1 to S13 relate to tin compounds; Examples S20 to S49 to silicon compounds; Examples S50 to S56 to titanium compounds; and Examples S60 to S67 to zirconium compounds. Examples A1 to A13, relating to mixes Nos. M1 to M103, are applications Examples directly illustrating the method of the invention including controls.

For clarity where compounds of the general formula (I) in which X is not a direct bond are described the $R^2$ group(s) is(are) referred to as compound acrylate (crotonate) groups. For example the group $-OCH_2CH_2O_2CCH=CH_2$ is called ethoxyacrylate and the group $-[O(CH_2)_5CO)_2OCH_2CH_2O_2CCH:CH_2]$ is called dicaprylethoxyacrylate.

In the synthesis Examples NMR $H^1$ spectra were run on a Joel MH100 spectrometer at 100 MHz using tetramethylsilane as the internal standard. IR spectra were run on a Perkin Elmer 599 Infrared spectrophotometer. Liquid samples were run as thin films and solids as mulls in a conventional hydrocarbon carrier (nujol).

EXAMPLE S1

Di-butyltin diacrylate

A mixture of dibutyltin oxide (24.9 g; 0.1M) and acrylic acid (14.4 g; 0.2M) in 200 ml of dry benzene was refluxed until 1.8 ml of water (0.1M) had been removed azeotropically. The reaction mixture was decolourized with activated charcoal, dried with anhydrous sodium sulphate and the benzene was evaporated to give 34.1 g; 91% of theory, of crude dibutyltin diacrylate as a liquid. An attempt to purify the product by distillation failed because the product spontaneously polymerized at temperatures above 60° C. Elemental (C,H) analysis of the product gave the following results:

|            | C     | H    |
|------------|-------|------|
| % Expected | 44.83 | 6.45 |
| % Found    | 44.97 | 6.45 |

The product was also subjected to IR and NMR spectral analysis with the following results:

Infrared Major Signals at (cm$^{-1}$): 2961, 2930, 2875, 2865, 1730, 1649, 1638, 1540–1590 (broad signal), 1405–1430, 1365, 1338, 1262, 1184, 1047, 983, 962, 915, 880, 829, 719, 700–670 and 630.

The infrared spectrum lacks a broad signal in the region of 3000 to 3500 cm$^{-1}$ indicating the absence of OH groups. The peak at 1730 cm$^{-1}$ can be assigned to the acrylate carbonyl group and that at 829 cm$^{-1}$ can be assigned to the acrylate C=C group.

NMR Description of Spectrum:

| Location (δ) | Description | No. of $H^1$ (by integration) | Assignment |
|---|---|---|---|
| 0.7 to 1.8 | complex multiplet | 18 | butyl protons |
| 5.88 to 6.68 | complex multiplet | 6 | acrylate protons |

Analysis of acrylate multiplet

Signals were identified at locations (δ): 5.88, 5.9, 5.98, 6.00, 6.09, 6.28, 6.42, 6.48, 6.65., 6.66 and 6.68. The acrylate group can be described as:

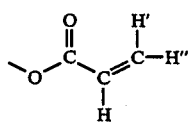

The elemental and spectral analysis data confirm the identity of the product and indicate that the "crude" product is, in fact, relatively pure.

EXAMPLES S2 TO S8

The following di-substituted tin diacrylates:
S2 dimethyltindiacrylate
S3 di-n-propyltin diacrylate
S4 di-iso-butyltin diacrylate
S5 dioctyltin diacrylate
S6 didecyltin diacrylate
S7 didodecyltin diacrylate
S8 di-iso-pentyltin diacrylate
were made by the general method of Example S1 by substituting the corresponding di-substituted tin oxide for the di-n-butyltin oxide used in Example S1. The results of infrared and NMR spectral analysis of the compounds obtained, including that of Example S1, are summarised in Table S1 below.

EXAMPLE S9

Tributyltin acrylate

A mixture of bis(tri-n-butyltin)oxide (11.7 g; 0.0196M) and acrylic acid (2.82 g; 0.0392M) in dry benzene (200 ml) was refluxed until 0.36 ml of water (0.02M) had been removed azeotropically. The reaction mixture was decolourized with activated charcoal and dried over anhydrous sodium sulphate. Removal of the benzene gave 13.9 g; 96% of theory of solid product.

Elemental Analysis

|            | C     | H    |
|------------|-------|------|
| % Expected | 49.89 | 8.37 |
| % Found    | 50.08 | 8.28 |

The product was subjected to infrared and NMR spectral analysis as described in Example 1 and the results are summarized in Table S2.

EXAMPLES S10

Tri-n-butyltin crotonate

Tri-n-butyltin crotonate was synthesised by the method described in Example S9 above by substituting crotonic acid for the acrylic acid used in Example S9. The results of IR and NMR spectral analysis are included in Table S1 below.

The NMR data for S10 include the protons on the 3-carbon atom under the "acrylate" column.

EXAMPLE S11

Di-n-butyltin dicrotonate

The title compound was made by the method described in Example S1 but substituting crotonic acid for the acrylic acid used in Example S1. The product was subjected to infrared and NMR spectral analysis and the results are given in Table S1 below. The NMR spectra include detail as described in Example S10 above.

EXAMPLE S12

Di-n-butyltin acrylate crotonate

The title compound was made by the method described in Example S1 but substituting a 1:1 molar mixture of acrylic and crotonic acids for the acrylic acid used in Example S1. The product was a liquid. Infrared and NMR spectral analysis was carried out as described in Example 1. The infrared spectrum lacks an OH signal and shows peaks at 1730 and 1705 cm$^{-1}$, which can be assigned to the two carboxyl groups and at 830 cm$^{-1}$, which can be assigned to the carbon carbon double bonds. It is not possible to make an unambiguous direct assignment for the different carboxyl absorptions.

NMR Description of Spectrum

| Location (δ) | Description | No. of H$^1$ (by integration) | Assignment |
|---|---|---|---|
| 0.7 to 2 | complex multiplet | 21 | butyl protons |
| 1.76 | doublet (J = 7 Hz) | | crotonate methyl protons |
| 5.5 to 6.3 | complex multiplet | 3 | acrylate protons |
| 5.65 | doublet (J = 7 Hz) | 1 | crotonate alpha-proton |
| 6.59–6.93 | complex quartet | 1 | crotonate beta-proton |

The signals for the methyl protons and the vinyl protons of the crotonate group were clearly identifiable as was the pattern of the complex multiplet assigned to the acrylate protons. The integration was a good fit.

The product made in this Example is described above as if it were a single compound. Although the spectroscopic data is consistent with it being a single compound viz: di-n-butyltin acrylate crotonate we believe, in view of the synthetic route used, that the product is a statistical mixture including the two bis-carboxylates as well as the mixed carboxylate. If the product is a mixture of the three predicted components then we except that the entropy of mixing will make it easier to formulate coatings.

EXAMPLE S13

Tributyltin ethoxyacrylate

Tributyltin methoxide (5 g; 0.0155M) and 2-hydroxyethyl acrylate (1.8 g; 0.0155M) were mixed together in a round bottom flask which was then put on a rotary evaporator for 0.5 hr to strip off the methanol produced. 6.5 g (100% of theory) of the title compound was obtained. The product was subjected to infrared and NMR spectral analysis and the results are summarised in Table S1 below. In the NMR spectrum a small peak at δ=3.8 was observed which was assigned to residual unreacted tributyltin methoxide.

EXAMPLE S14 AND 15

The following compounds:
S14 tri-n-butyltin hexyloxyacrylate, and
S15 di-n-butyltin diethyloxyacrylate
were made by the method described in Example S13 above, but using the appropriate tin compound (tri-n-butyltin methoxide for S14 and dibutyltindimethoxide for S15) and the appropriate hydroxyl compound (6-hydroxyhexyl acrylate for S14 and 2-hydroxyethyl acrylate for S15) in the molar ratio of one mole of tin compound to one mole of hydroxyl compound per methoxide group in the tin compound. The results of NMR and infrared spectral analysis on the products are summarized in Table S1 below.

EXAMPLE S16 n-Butyltin triacrylate

The title compound was made by the method described in Example S1 but substituting n-buytyltin oxide hydroxide for the di-n-butyltin oxide used in Example S1, using 3 moles of acrylic acid and azetropically removing 2 moles of water for each mole of tin compound used.

EXAMPLE S20

Dimethylsilicon di(ethoxyacrylate)

Dimethylsilylchloride (6.1 g; 0.047M) was added slowly to an ice cooled mixture of 2-hydroxyethyl acrylate (11 g; 0.0974M), triethylamine (9.6 g; 0.0947M) and dry diethyl ether (100 ml). The mixture was then refluxed for 2 hours and cooled. The triethylamine hydrochloride precipitate was filtered off and the solvent removed from the filtrate to give 6.6 g (81% of theory) of the product. An attempt to purify the product by distillation was unsuccessful because the product polymerized on heating. Infrared and NMR spectral analysis of the product confirmed it as the title compound and the results are summarised in Table S2 below.

EXAMPLES S21 TO S42

The following compounds
S21 dimethylsilicon diacrylate
S22 dimethylsilicon di-(ethoxyacrylate)
S23 dodecylsilicon triacrylate
S24 dodecylsilicon tri-(ethoxyacrylate)
S25 silicon tetra-(ethoxyacrylate)
S26 octadecylsilicon tri-(ethoxyacrylate)
S27 methylsilicon tri-(ethoxyacrylate)
S28 methyl-phenylsilicon di-(ethoxyacrylate)
S29 diphenylsilicon di-(ethoxyacrylate)
S30 phenylsilicon tri-(ethoxyacrylate)
S31 benzylsilicon tri-(ethoxyacrylate)
S32 vinylsilicon tri-(ethoxyacrylate)
S33 vinylsilicon tri-(hexyloxyacrylate)
S34 methyl-vinylsilicon di-(ethoxyacrylate)
S35 cyclohexylsilicon tri-(ethoxyacrylate)
S36 dimethylsilicon di(dodecyloxyacrylate)
S37 allylsilicon tri-(ethoxyacrylate)
S38 octadecylsilicon triacrylate
S39 dimethylsilicon di-(triethoxyacrylate)
S40 phenyl-4-methylphenylsilicon di(ethoxyacrylate)
S41 diphenylmethylsilicon tri-(ethoxyacrylate)
S42 phenyl-4-chlorophenylsilicon di-(ethoxyacrylate)
were made by the method described in Example S20 by using the corresponding silicon chloride compound for the dimethylsilyl dichloride used in Example S20 and using the appropriate hydroxy compound (acrylic acid for S21, S23 and S38, 2-hydroxyethyl acrylate, itself, for S22, S24 to S32, S34, S35, S37 and S40 to S42, 6-hydroxyhexyl acrylate for S33, 12-hydroxydodecyl acrylate for S36 and hydroxytrioxyethylene acrylate, H(OCH$_2$CH$_2$)$_3$O$_2$CCH:CH$_2$, for S39) for the 2-hydroxyethyl acrylate used in Example S20. The quantities used were in the proportions 1 mole of silicon compound to one mole of each of the hydroxy compound and triethylamine for each atom of chlorine in the silicon compound. Infrared and NMR spectral analysis of the products is summarised in Table S2 below.

EXAMPLE S43 TO S49

The following compounds:
S43 silicon tetra-(dicaprylethoxyacrylate)
S44 dodecylsilicon tri-(dicaprylethoxyacrylate)
S45 benzylsilicon tri-(dicaprylethoxyacrylate)
S46 phenylsilicon tri-(dicaprylethoxyacrylate)

S47 vinylsilicon tri-(dicaprylethoxyacrylate)
S48 methylsilicon tri-(dicaprylethoxyacrylate)
S49 diphenylsilicon di-(dicaprylethoxyacrylate)
were made by the method described in Example S20 above but substituting w-hydroxydicapryoxyethylene acrylate viz:

H—[O(CH$_2$)$_5$CO]$_2$OCH$_2$CH$_2$O$_2$CCH:CH$_2$ commercially available from Union Carbide under the designation Tone 100, and the corresponding substituted silicon chloride with triethylamine, all in appropriate amounts for the 2-hydroxyethyl acrylate and dimethylsilylchloride used in Example S20.

The results of I.R. and NMR analysis of these materials is summarized in Table S2 below.

EXAMPLE S50

Di-iso-propoxytitanium diacrylate

To ice cold tetra-iso-propyltitanate (titanium (IV) isopropoxide) (9.55 g; 0.033M) in a distillation flask, acrylic acid (4.8 g; 0.066M) was added. The mixture was subjected to vacuum distillation ca. 1 mm Hg (133 Pa) at 37° C. on a rotary evaporator to remove isopropanol ca. 4.4 g. The product is the distillation flask was 10.1 g (97% of theory) of a yellow liquid. The results of NMR spectral analysis are summarised in Table S3 below. It was not possible to obtain useful IR spectra because the product hydrolysed rapidly. These results are consistent with the product being the title compound as such but we think it probable that the product is in fact a statistical mixture of the possible acrylate products and possibly unreacted starting material, the product having the 'average' composition corresponding to the title compound.

EXAMPLES S51 TO S56

The following compounds:
S51 di-iso-propoxytitanium di-(ethoxyacrylate) S52 titanium tetra-(ethoxyacrylate)
S53 di-(4-bromophenoxy)titanium di-(ethoxyacrylate)
S54 di-(3-chlorophenoxy)titanium di-(ethoxyacrylate)
S55 di-n-decyloxytitanium di-(ethoxyacrylate)
S56 dibenzyloxytitanium di-(ethoxyacrylate)
were made by the general method described in Example S50 but substituting the corresponding starting materials in molar proportions corresponding to the stoichiometry of the title compounds and removing the corresponding amount of the alcohol by vacuum distillation. The results of NMR spectral analysis of these products is summarised in Table S3 below. (For some of these compounds IR spectra are not useful because of rapid hydrolysis).

EXAMPLES S60 TO S67

The zirconium compounds:
S60 tri-n-propoxyzirconium acrylate
S61 tri-n-decyloxyzirconium acrylate
S62 di-n-decyloxyzirconium diacrylate
S63 di-n-octyloxyzirconium diacrylate
S64 octadecyloxyzirconium diacrylate
S65 dioctadecyloxyzirconium triacrylate
S66 n-decyloxyzirconium triacrylate
S67 dibenzyloxyzirconium diacrylate
were prepared by the method described in Example S50 but substituting the corresponding zirconium compound for the tetra-iso-propyltitanate used in Example S50. The results of IR and NMR analysis are set out in Table S4 below. (Compound S60 is susceptible to hydrolysis so that IR data are not useful.) In the application Examples which follow the materials used are as follows:

| name/description | code/abbreviation | source |
|---|---|---|
| tripropyleneglycol diacrylate | TPGDA | from Cray Valley Products Ltd. |
| acrylated urethane oligomer (Synocure 3131) | 3131 | from Cray Valley Products Ltd. |
| acrylated epoxy oligomer (Synocure 3104) | 3104 | from Cray Valley Products Ltd. |
| trimethylolpropane triacrylate | TMPTA | from Cray Valley Products Ltd. |
| polyester acrylate | PE 55F | from B.A.S.F. |
| hexane diol diacrylate | HDDA | from Cray Valley Products Ltd. |
| a resin mix | D070 | comprising: TPGDA 56.7% 3131 28.5% Gasil EBN 14.8% |

(Gasil EBN is a 'flatting' (non-hiding) silica pigment from Crosfield Ltd.)

The metallo-organic compounds used are referenced by "S" numbers corresponding to the corresponding Synthesis Example Number.

Doses quoted are those determined using standard film dosimeters under the same irradiation conditions. The test methods used in the applications Examples are as follows:

Sheen Rub Mark—samples of coating composition are coated onto a paper substrate and cured. The cured sample is positioned under a mechanical cloth-covered thumb 0.5 inch (12.5 mm) square which is rotated once under a 3lb (1.36 kg) weight load. The mark on the cloth is assessed visually.

The greater the degree of cure the less the cloth is marked. Results are given as a numerical rating from 0 to 5, with 0 for no mark, 3 for a faint mark and 5 for a readily seen mark i.e. the lower the value the better the result.

MEK (methyl ethyl ketone) Swab Test—samples of coating composition are coated onto phosphate primed steel sheets and then cured. A cotton wool swab soaked in MEK is rubbed to and fro over the cured coating by hand. The time (in seconds) taken to break through the coating is measured and the test repeated to obtain an average value. The greater the degree of cure the longer the time to break through the coating.

Acetone Rub Test—samples of coating composition are coated onto a paper substrate and cured. The coated paper is clamped flat under a mechanical arm which "double rubs" an acetone soaked swab on the paper under a downward load of 0.5 kg force. The number of double rubs needed to break through the coating is noted and the test repeated to obtain an average value. The greater the number of double rubs the greater the degree of cure. To facilitate detection of the end point the test can be paused and a spot of dye (e.g. malachite green) solution placed on the area rubbed by the swab. If the coating is unbroken the dye solution can be wiped clearly away but if the coating is broken the dye will stain the paper substrate.

Dry Abrasion Test—Samples of coating composition are coated onto a paper substrate and cured. The coated sample was placed in the rub tester (described above under "Acetone Rub Test"). A felt pad with a piece of fine glass paper (guide 00—B.S. 871:1962—all particles to pass a mean sand particle B.S. sieve i.e. one having 89 μm apertures) adhered to the surface adjacent the test sample was fixed to the rub arm of the tester. The glass paper was double-rubbed on the surface of the sample under a downward load of 0.5 kg force. After every 5 double-rubs the glass paper surface was replaced to prevent abraded particles of the coating acting as a lubricant and reducing the effectiveness of the glass paper. The number of double-rubs to break through the coating was noted. Results quoted are the mean of at least two tests. As for the Acetone Rub Test a spot of dye solution can be used to aid in determining the end point.

Brittleness Test—A strip of paper coated with a cured layer of resin is folded in half and the crease examined to see to what extent the coating has fractured. (A spot of dye solution can be used to assist this determination.) The samples are ranked on a ranking scale of increasing brittleness from 0—not brittle (coating not showing fracture) to 5—very brittle.

Surface Adhesion Test—A strip of self-adhesive cellulose tape (Sellotape—Registered Trade Mark), 3 inches (7.6 cm) by 1 inch (2.5 cm) was evenly adhered (ensuring that no bubbles are formed) to the surface of a cured layer of resin coated on a paper substrate. The strip of adhesive tape was slowly pulled off. The amount of coating removed by the tape was taken as a measure of the adhesion of the coating to the substrate. Results are quoted on a ranking scale from 0—best adhesion i.e. least coating removed, to 5—worst adhesion.

Cross Hatch Test—diagonal cross hatch lines were cut at 2 mm intervals using a scalpel into the surface of a cured resin coating on a paper substrate. The amount of coating debris in the cut grooves, especially at points of intersection, is noted. The more debris the poorer the combination of brittleness and adhesion. The results are expressed on a ranking scale from 0 (best) to 5 (worst).

Pencil Hardness Test—A pencil with changeable 0.5 mm flat ended leads (made by Rotring) was held vertical with the lead in contact with the surface of a cured resin coating on a paper substrate placed on a flat horizontal surface. The paper was gently pulled along under the lead. The test result is the hardness of the pencil lead (expressed in pencil hardness i.e. HB, H, 2H, 3H, >3H) required to break the surface of the coating.

In many of these tests the determination of the end point depends on the judgment of the person conducting the test and/or the results are expressed in ranking, i.e. relative, scales. Accordingly whilst reasonable comparisons can be made between different samples in a single test run or experiment care should be taken in comparing the results of separate experiments.

EXAMPLE A1

A number of coating mixes were made up as set out below. Each of the mixes was coated onto 70 gm$^{-2}$ matt tracing paper (Gateway Natural Tracing (GNT), made by Wiggins Teape) on an RK Print Coat laboratory coater using a plain Meyer bar at speed setting 1 giving a coatweight of (approx) 5 gm$^{-2}$. The coating was cured by exposing it to varying doses in an Energy Sciences Inc. laboratory EB unit operating at 150 kV.

The compositions of the coating mixes and the curing performance and results of Sheen Rub Mark testing are set out in Table A1 below. Mixes 1 and 2 are controls. Coatings on paper cured to dryness unless otherwise indicated.

EXAMPLE A2

Six coating mixes were made up based on the resin mix D070 described above. Three of the mixes contained varying amounts from 0.5 to 3% of compound S1 (di-n-butyltin diacrylate) and were added to D070 and three were controls in which similar additional amounts of TPGDA were added to D070. Each of the mixes was coated and cured as described in Example A1 above. The coatweights were approximately 10 gm$^{-2}$. All the mixes were cured to dryness at both 5 kGy and 10 kGy. The cured coated papers were tested by the Sheen Rub Mark test described above and are set out in Table A2 below as comparisons between the examples and the controls.

EXAMPLE A3

Six coating mixes were made up and were coated onto 70 gm$^{-2}$ matt Gateway Natural Tracing as described in Example A1. Samples of each coating mix were also coated onto phosphate primed steel plates in an RK Print Coat Laboratory coater using a No. 4 Meyer bar at speed setting 1. All samples were cured in an Energy Sciences laboratory EB unit operating at 150 kV. The compositions of the mixes and the results of MEK Swab Testing on cured coated steel plates and observation of the dose at which the coated papers were cured are given in Table A3 below. Mixes 9 and 10 are controls.

EXAMPLE A4

Example A3 was repeated but using a variety of tin acrylate compounds. The MEK swab tests were carried out on coatings irradiated at the same dose as that which gives a dry cured coating on the paper. The compositions of the mixes used and the results obtained are set out in Table A4 below.

EXAMPLE A5

A number of coating mixes consisting of tin acrylates were made up and coated onto 70 gm$^{-2}$ Gateway Natural Tracing sheets taped to a 100 gm$^{-2}$ carrier web in a pilot plant Dixon Model 164 coater at 30 m.min$^{-1}$. The samples were syringed onto the paper and smoothed using two plain Meyer bars. The samples were then cured by passage through an ESH 150 scanning electron beam unit (made by Otto Dürr) operating at 150 kV. The composition of the mixes and the result of SATRA Acetone Rub testing after curing at various doses are set out in Table A5 below. Mixes 23 and 24 are controls.

EXAMPLE A6

Example A5 was repeated but using compositions containing resins or pigment in addition to the tin compounds used on their own in Example 5. The results of acetone rub testing of the film EB cured at 3.8 kGy are set out in Table A6 below.

EXAMPLE A7

Example A5 was repeated but substituting various silicon and titanium compounds for the tin compounds used in Example A5. The results are set out in Table A7 below.

EXAMPLE A8

Further samples of coating mixes containing various of the compounds described above were made up and coated onto a continuous web of tracing paper (Gateway Natural Tracing made by Wiggins Teape) and cured in an ESH 150 EB curing unit operating at 150 kV using a nitrogen gas blanket to exclude oxygen. In the EB curing zone, oxygen levels were less than 100 ppm and typically less than 30 ppm. Coating was effected by applying each mix onto the web of tracing paper moving at 10 m.min$^{-1}$ and passing the web with coating on under a fixed plain smoothing bar to spread and smooth the coating. This simple application technique does not enable close control of coatweight, which will largely depend on rate of application and mix viscosity. Measured coatweights were in the range 1 to 15 gm$^{-2}$ including some variations within individual samples. However, we noted no evidence of any variation of the dose required to cure the coatings with coatweight. The coatings were exposed to varying doses of EB radiation and the dose required to cure the coating was noted. Curing of the coating was assessed by a manual finger rub test which distinguished between those coatings which were not cured i.e. were still wet or smeared under finger rubbing and those which were cured i.e. were dry and did not smear under finger rubbing. The composition of the coating mixes and the doses required to effect curing are set out in Table A8 below. Mixes M40, M45 and M56 were heated to ca. 50° C. to make them more readily coatable as they were or contained solid material at ambient temperature. The measured average coatweights (in gm$^{-2}$) were 2.2 g for M48, 7.1 for M51 and 8 for M53. Mixes 40 to 47 were coated onto 85 gm$^{-2}$ and mixes 48 to 58 onto 75 gm$^{-2}$ tracing paper.

EXAMPLE A9

Samples of various resins were coated onto a paper web and smoothed prior to EB curing at doses ranging from 2.5 to 60 kGy. The results of testing of these samples are set out in parts a to f of Table A9 below. The variation in coatweight between the different resins is largely a result of the varying viscosity of the resins and, therefore, the effectiveness of the smoother in spreading them.

The test results show that the coatings produced according to the invention (those made using mixes M61 to M70) have superior rub resistance as compared with the controls (those made using mixes M59 and M60) especially at low doses. Within the invention the coatings produced from tin compounds tended to be harder and more solvent resistant whereas those produced from silicon compounds were tougher. At higher doses the coatings produced from silicon compounds were notably less brittle than the controls.

From these results and those of Example A7 it can be seen that the zirconium and especially the titanium compounds though curable have much lower activity than tin and silicon compounds.

EXAMPLE A11

Mixes M84 to M90 which are samples of compounds S43 to S49 and Mixes M82 and M83 (as controls) were coated onto sheets of 70/75 gsm Gateway Natural Tracing as described in Example A5 above, but at 20 m.min$^{-1}$, and irradiated with varying doses of EB radiation. The results of testing the cured coated sheets are set out in parts a to c of Table A11 below. The iso-propanol and hexane Rub Resistance tests are performed in the same way as the Acetone rub resistance test but using iso-propanol and hexane respectively instead of acetone. The cured coatings produced from S43 to S49 are relatively more resistant to non-polar solvents than to polar solvents such as acetone. They are also relatively harder than the controls and less brittle.

EXAMPLE A12

Combinations of compounds of the general formula I where M is different can produce particularly good results. Thus, repeating Example A5 using Mix M92, a mixture of compounds S1 (dibutyltin diacrylate) and S24 (dodecylsilicon tri-(ethoxyacrylate), gave the results set out in Table A12 below. Mix 91 is a control using TPGDA.

EXAMPLE A13

Further samples were coated and cured as generally described in Example A5 using mixes M93 to M103. The compounds used in the mixes and the results obtained are set out in Table A13 below.

TABLE S1

| Ex. No. | Title Compound | Infrared (cm$^{-1}$) | | | NMR | | | | Remarks |
| | | OH | C=O | C=C | alkyl δ | alkyl I | acrylate δ | acrylate I | |
| --- | --- | --- | --- | --- | --- | --- | --- | --- | --- |
| S1 | di-n-butyltin diacrylate | None | 1730 | 829 | 0.7–1.8 | 1.8 | 5.88–6.68 | 6 | good fit on integration |
| S2 | dimethyltin diacrylate | None | 1740 | 820 | 0.7–1.1 | 7 | 5.8–6.6 | 6 | singlet alkyl proton signal reasonable fit on integration |
| S3 | di-n-propyltin diacrylate | None | 1731 | 831 | 0.9–2.0 | 14 | 5.7–6.6 | 6 | |
| S4 | di-iso-butyltin diacrylate | None | 1732 | 829 | 0.9–1.6 | 18.5 | 5.7–6.65 | 6 | good fit on integration |
| S5 | dioctyltin diacrylate | None | 1732 | 829 | 0.8–1.9 | 34 | 5.7–6.0 | 6 | good fit on integration |
| S6 | didecyltin diacrylate | None | 1732 | 829 | 0.6–1.8 | 45 | 5.5–6.5 | 6 | |
| S7 | didodecyltin diacrylate | None | 1741 | 825 | 0.7–1.6 | 54 | 5.6–6.3 | 6 | |
| S8 | di-iso-pentyltin diacrylate | None | 1565 | 830 | 0.4–1.0 / 1.0–2.0 | 12 / 10.5 | 6.4–5.5 | 6 | good fit on integration |
| S9 | tri-n-butyltin acrylate | None | 1535 | 825 | 0.1–1.8 | 28 | 5.6–6.3 | 3 | |
| S10 | tri-n-butyltin crotonate | None | — | — | 0.8–1.8 / 1.8 | 29 | 6.67–6.96 / 5.82 | 1 | Peaks at 1.8 doublet J = 6 Hz at 5.82 doublet J = 14 Hz |
| S11 | di-n-butyltin dicrotonate | None | 1578 / 1441 | — / — | 0.8–1.9 / 1.88 | 25 | 5.93 / 6.9–7.28 | 2 | Peak at 1.88 doublet J = 7 Hz at 5.93 doublet J = 14 Hz |
| S12 | di-n-butyltin acrylate crotonate | None | 1730 / 1705 | 830 | 0.7–2 / 1.76 | 21 | 6.59–6.93 / 5.65 / 5.5–6.3 | 1 / 1 / 3 | Peaks at 1.76 doublet J = 7 Hz, at 5.65 doublet J = 14 Hz at 6.59–6.93 complex quartet, at 5.5–6.3 - acrylate pattern |

TABLE S1-continued

| Ex. No. | Title Compound | Infrared (cm⁻¹) OH | C=O | C=C | NMR alkyl δ | I | acrylate δ | I | Remarks |
|---|---|---|---|---|---|---|---|---|---|
| S13 | n-butyltin triacrylate | None | 1725 | 825 | 0.7–1.8 | 9 | 5.5–6.4 | 10 | reasonable fit on integration |

TABLE S2

| Ex. No. | Title Compound | Infrared (cm⁻¹) OH | C=O | C=C | NMR alkyl δ | I | acrylate δ | I | Remarks |
|---|---|---|---|---|---|---|---|---|---|
| S20 | dimethylsilicon di-(ethoxyacrylate) | None | 1729 | 807 | 0.2<br>3.9<br>4.2 | 6<br>4<br>4 | 5.74–6.5 | 6 | Peaks at 0.2 singlet, at 3.9 and at 4.2 triplets, J = 6 Hz |
| S21 | dimethylsilicon diacrylate | 2800–3500* | 1725<br>1710* | 805 | 0.4 | 6 | 5.7–6.4 | 6.5 | Peak at 0.4 is singlet |
| S22 | octylsilicon tri-(ethoxyacrylate) | None | 1725 | 810 | 0.6–1.8<br>4.0<br>4.3 | 17<br>} 11 | 5.8–6.5 | | Peaks at 0.6–1.8 multiplet, at 4.0 and 4.3 triplets, J = 6 Hz |
| S23 | dodecylsilicon triacrylate | None | 1725 | 819 | 0.9–1.7 | 26.3 | 5.8–6.4 | 9 | Peaks at 0.9–1.7 multiplet |
| S24 | dodecylsilicon tri-(ethoxyacrylate) | None | 1729 | 810 | 0.5–1.4<br>3.9<br>4.1 | 27<br>6<br>6 | 5.6–6.3 | 9 | Peaks at 0.5–1.4 multiplet, at 3.9 and 4.1 triplets J = 6 Hz |
| S25 | silicon tetra-(ethoxyacrylate) | 3200* | 1730 | 810 | 3.9<br>4.1 | 8<br>8 | 5.6–6.4 | 12 | Peaks at 3.9 and 4.1 triplets J = 6 Hz Integration good fit |
| S26 | octadecylsilicon tri-(ethoxyacrylate) | None | 1730 | 810 | 0.7–1.4<br>3.9<br>4.1 | 38<br>6<br>6 | 5.6–7.4 | 9 | Peaks at 0.7–1.4 multiplet at 3.9 and 4.1 triplets J = 6 Hz |
| S27 | methylsilicon tri-(ethoxyacrylate) | 3600–3100* | 1725 | 810 | 0.2<br>4.0<br>4.3 | 1<br>6<br>6 | 5.7–6.5 | 9 | Peaks at 0.2 singlet, at 4.0 and 4.2 triplets J = 6 Hz |
| S28 | methyl-phenylsilicon di-(ethoxyacrylate) | None | 1725 | 810 | 0.3<br>3.8<br>4.1 | 3<br>4<br>4 | 5.5–6.3 | → | Peaks at 0.3 singlet, at 3.8 and 4.1 triplets J = 6 Hz. Aromatic protons at δ = 6.95–7.5 (integration = 6) |
| S29 | diphenylsilicon di-(ethoxyacrylate) | None | 1725 | 810 | 3.8<br>4.1 | 4<br>4 | 5.4–6.2 | 6 | Peaks at 3.8 and 4.1 triplets J = 6 Hz Aromatic protons at δ = 6.8–7.5 |
| S30 | phenylsilicon tri-(ethoxyacrylate) | None | 1725 | 810 | 4.0<br>4.2 | 6<br>6 | 5.4–6.2 | 9 | Peaks at 4.0 and 4.2 triplets J = 6 Hz Aromatic protons at δ = 7.1 to 7.6 (Integration = 5) |
| S31 | benzylsilicon tri-(ethoxyacrylate) | None | 1725 | 810 | 2.19<br>3.8<br>4.1 | 2<br>6<br>6 | 5.6–6.4 | 9 | Peaks at 2.19 singlet, at 3.8 and 4.1 triplets J = 6 Hz. Aromatic protons at δ = 7.02 (Integration = 5) |
| S32 | vinylsilicon tri-(ethoxyacrylate) | 3700–3100* | 1725 | 810 | 3.8<br>4.1 | 6<br>6 | 5.4–6.3 | 12 | Peaks at 3.8 and 4.1 triplets J = 6 Hz at 5.4–6.3 complex multiplet (acrylate and vinyl protons) |
| S33 | vinylsilicon tri-(hexyloxyacrylate) | None | 1725 | 810 | 1.1–1.9<br>3.6<br>4.4 | 24<br>6<br>6 | 5.5–6.3 | 12 | Peaks at 3.6 and 4.1 triplets J = 6 Hz at 5.5–6.3 complex multiplet (acrylate and vinyl protons) |
| S34 | methyl-vinyl-silicon di-(ethoxyacrylate) | None | 1728 | 809 | 0.2<br>3.8<br>4.1 | 3<br>4<br>4 | 5.6–6.3 | 9 | Peaks at 0.2 singlet, at 3.8 and 4.1 triplets J = 6 Hz. Vinyl protons identified as singlet δ — 5.76 within acrylate multiplet |
| S35 | cyclohexylsilicon tri-(ethoxyacrylate) | None | 1735 | 820 | 0.6–1.7<br>3.8<br>4.05 | 11<br>5.5<br>5.5 | 6.5–7.3 | 9 | Peaks at 3.8 and 4.05 triplets J = 6 Hz |
| S36 | dimethylsilicon di-(dodecyloxyacrylate) | None | 1728 | 810 | 0.1<br>1–2<br>3.5<br>4.0 | 6.5<br>40<br>4<br>4 | 5.5–6.2 | 7 | Peaks at 0.1 singlet, at 1–2 multiplet, at 3.5 and 4.0 triplets |
| S37 | allylsilicon tri-(ethoxyacrylate) | 3600–3100* | 1725 | 810 | 1.6<br>3.8<br>4.1<br>4.7–4.9 | 2<br>6<br>6<br>3 | 5.6–6.3 | 9 | Peaks at 1.6 doublet J = 6 Hz, at 3.8 and 4.3 triplets, at 4.7–4.9 complex multiplet |
| S38 | octadecylsilicon triacrylate | 3600–3600* | 1725<br>1625* | 810 | 0.9–1.6 | 40 | 5.7–6.4 | 9 | Peaks at 0.9–1.6 broad multiplet. Integration is a reasonable fit. |
| S39 | dimethylsilicon di-(tri-oxyethyleneacrylate) | 3700<br>3200* | 1730 | 810 | 0.12<br>3.9–3.46<br>4.28 | 6<br>29<br>4 | 6.56–5.68 | 6 | Peak at 0.12 singlet. at 3.9–3.46 multiplet - most protons of trioxyethylene. 4.28 triplet methylene adjacent to acrylate. Integration is good fit. |
| S40 | phenyl-4-methyl-phenylsilicon di-(ethoxyacrylate) | 3572* | 1717 | 808 | 2.36<br>4.00<br>4.32 | 3<br>3.5<br>4 | 5.66–6.58 | 6 | Peak at 2.36 singlet. 4.0 and 4.32 triplets. Aromatic protons 7.06 7.8 (I = 9). Integration is good fit. |
| S41 | diphenylmethylsilicon tri-(ethoxyacrylate) | None | 1725 | 810 | 3.9<br>4.1<br>4.3 | 6<br>6<br>1 | 5.6–6.5 | 9 | Peaks at 3.9 and 4.1 triplets J = 6 Hz, at 4.3 singlet. Aromatic protons of 7.0–7.2 (I = 10). Integration is good fit |

TABLE S2-continued

| Ex. No. | Title Compound | Infrared (cm$^{-1}$) OH | C=O | C=C | NMR alkyl δ | I | NMR acrylate δ | I | Remarks |
|---|---|---|---|---|---|---|---|---|---|
| S42 | phenyl-4-chloro-phenylsilicon tri-(ethoxyacrylate) | None | 1730 | 810 | 3.8<br>4.1<br>4.3 | 6 | 5.7–6.6 | 9 | Peaks at 3.8 and 4.1 triplets J = 6 Hz, at 4.3 singlet. Aromatic protons at 7.0-7.2 (I = 9). Integration is good fit |
| S43 | silicon tetra-(dicapryl-ethoxyacrylate) | None | 1730 | 810 | 1.2–1.9<br>ca. 2.2<br>3.73–4.6 | 48 | 5.9–6.8 | 13 | Peaks at 1.2–1.9, ca. 2.2 and 3.73–4.6 are complex multiplets Integration a reasonable fit. |
| S44 | dodecylsilicon tri-(di-caprylethoxyacrylate) | 3447* | 1733 | 810 | 0.5–1.9<br>2.2–2.56<br>3.7–4.58 | 56<br>13<br>24 | 5.8–6.7 | 9 | Peaks at 0.5–1.9, 2.2–2.56 and 3.7–4.58 are complex multiplets. Integration is a reasonable fit. |
| S45 | benzylsilicon tri-(di-caprylethoxyacrylate) | 3449* | 1732 | 810 | 1.2–1.9<br>2.14–2.54<br>3.6–4.6 | 34<br>14<br>24 | 5.8–6.7 | 9 | Peaks at 1.2–1.9, 2.14–2.54, 3.6–4.6 5.8–6.7 complex multiplets. Aromatic protons at 7.26 (I = 5). Integration is a good fit. |
| S46 | phenylsilicon tri-(di-caprylethoxyacrylate) | 3442* | 1732 | 810 | 1.2–1.9<br>2.2–2.54<br>3.72–4.6 | 34<br>12<br>24 | 5.8–6.7 | 9 | Peaks at 1.2–1.82, 2.1–2.24 and 3.6–4.4 complex multiplets at 5.6–6.5 complex multiplet (acrylate + vinyl protons). Integration is a good fit |
| S47 | vinylsilicon tri-(di-caprylethoxyacrylate) | 3440* | 1730 | 810 | 1.2–1.82<br>2.1–2.24<br>3.6–4.4 | 36<br>12<br>24 | 5.6–6.5 | 12 | Peaks at 1.2–1.82, 2.1–2.24 and 3.6–4.4 complex multiplets at 5.6–6.5 complex multiplet (acrylate + vinyl protons). Integration is a good fit. |
| S48 | methylsilicon tri-(di-caprylethoxyacrylate) | 3540* | 1730 | 810 | 0.12<br>1.16–1.48<br>2.1–2.3<br>3.5–4.4 | 2<br>36<br>12<br>24 | 5.7–6.5 | 9 | Peaks at 1.3 doublet J = 6 Hz Peaks at 0.12, 1.16–1.98, 2.1–2.3 3.5–4.4 and 5.7–6.5 are complex multiplets. Integration is a good fit |
| S49 | dibenzylsilicon di-(di-caprylethoxyacrylate) | 3447* | 1731 | 810 | 1.1–1.9<br>2.1–2.3<br>3.1–4.52 | 24<br>8<br>16 | 5.7–6.64 | 6 | Peaks at 1.1–1.9, 2.1–2.3, 3.6–4.52 are complex multiplets. Aromatic protons at 7.46–7.7 (I = 10). Integration is a good fit. |

*These peaks are small and indicate the presence of residual hydroxy-starting material or of hydrolysis products.

TABLE S3

| Ex. No. | Title Compound | Infrared (cm$^{-1}$) OH | C=O | C=C | NMR alkyl δ | I | NMR acrylate δ | I | Remarks |
|---|---|---|---|---|---|---|---|---|---|
| S50 | di-iso-propyloxytitanium diacrylate | — | — | — | 1.3<br>4.6–5.1 | 14<br>2 | 5.5–6.4 | 4 | Peaks at 1.3 doublet J = 6 Hz at 4.6–5.1 multiplet (H on 2-carbon atom). Integration not very good fit because of hydrolysis |
| S51 | di-iso-propyloxytitanium di(2-acrylyloxy)ethoxide | — | — | — | 1.2<br>4.1–4.8 | 12<br>12 | 5.6–6.4 | 6 | Peaks at 1.2 doublet J = 6 Hz at 4.1–4.8 complex multiplet. Integration is reasonable fit. |
| S52 | titanium tetra-(ethoxyacrylate) | — | — | — | 3.7–4.3 | 17 | 5.6–6.4 | 6 | No isopropyl protons in NMR Integration is good fit |
| S53 | di-(4-bromophenoxy)-titanium di-(ethoxyacrylate) | — | — | — | 4.2–5.0 | 8 | 5.8–6.6 | 6 | Peaks at 4.2–5 complex multiplet. Aromatic protons doublets at 6.7 and 7.4 (I = 8). Integration is good fit. |
| S54 | di-(3-chlorophenoxy)-titanium di-(ethoxyacrylate) | 3000–3600* | 1730 | 810 | 3.4–4.2 | 8 | 5.6–6.4 | 6 | Peaks at 3.4–4.2 complex multiplet. Aromatic protons at 6.4–7.1 (I = 7). Integration is reasonable fit. |
| S55 | di-n-decyloxytitanium di-(ethoxyacrylate) | | | | | | | | |
| S56 | dibenzyloxytitanium di-(ethoxyacrylate) | 3200–3600* | 1730 | 812 | 3.9–5.0<br>5.3 | 8<br>4 | 5.7–6.7 | 6 | Peaks at 3.9–5.0 complex multiplet at 5.3 singlet. Aromatic protons at 7.0–7.6 (I = 11). Integration is good fit. |

*These peaks are small and indicate residual hydroxy-starting materials or hydrolysis products.

TABLE S4

| Ex. No. | Title Compound | Infrared (cm$^{-1}$) OH | C=O | C=C | NMR alkyl δ | I | NMR acrylate δ | I | Remarks |
|---|---|---|---|---|---|---|---|---|---|
| S60 | tri-n-propoxyzirconium acrylate | — | — | — | 0.88<br>1.5<br>3.6 | 8<br>5<br>5 | 5.5–6.4 | 3 | Peaks at 0.88 triplet J = 6 Hz at 1.5 pentet J = 6 Hz at 3.6 broad singlet |
| S61 | tridecyloxyzirconium acrylate | 3600–3100* | — | 830 | 0.9–1.9 | 57 | 5.5–6.7 | 3 | Peaks at 0.9–1.9 complex multiplet at 3.7 triplet. Integration is reasonable fit. |
| S62 | didecyloxyzirconium diacrylate | 3700–3100* | — | 830 | 0.8–1.5<br>3.9 | 38<br>4 | 5.7–6.7 | 6 | Peaks at 0.8–1.5 complex multiplet at 3.9 triplet. Integration is reasonable fit. |
| S63 | di-n-octyloxyzirconium diacrylate | 3700–3000* | 1730 | 830 | 0.7–1.8<br>3.7 | 33<br>4 | 5.6–6.6 | 6 | Peaks at 0.7–1.8 complex multiplet at 3.7 triplet. Integration is reasonable fit. |

TABLE S4-continued

| Ex. No. | Title Compound | Infrared (cm⁻¹) OH | C=O | C=C | NMR alkyl δ | I | acrylate δ | I | Remarks |
|---|---|---|---|---|---|---|---|---|---|
| S64 | octadecyloxyzirconium triacrylate | 3500–3000* | — | 830 | 0.7–1.6 3.6 | 37 2 | 5.5–6.4 | 10 | Peaks at 0.7–1.6 complex multiplet at 3.6 triplet. Integration is reasonable fit. |
| S65 | diacrylate | 3500–3000 | — | 825 | 0.7–1.5 3.6 | 70 4 | 5.4–6.4 | 6 | Peaks at 0.7–1.5 complex multiplet at 3.6 triplet. Integration is good fit. |
| S66 | decyloxyzirconium triacrylate | 3600–3000 | 1725 | 830 | 0.8–1.8 3.8 | 20 2 | 5.7–6.7 | 9 | Peaks at 0.8–1.8 complex multiplet at 3.8 triplet. Integration is reasonable fit. |
| S67 | dibenzyloxyzirconium diacrylate | 3600–3000* | 1725 | 832 | 4.7 | 4 | 5.5–6.4 | 6 | Peak at 4.7 singlet. Aromatic protons at 6.8–7.2 (I = 10). Integration is good fit. |

*These peaks are small and indicate the presence of residual hydroxy-starting material or of hydrolysis products.

TABLE A1

| Mix No. | Composition parts by wt. S1 | TPGDA | 3131 | 3104 | Sheen Rub Mark at dose (kGy) 3 | 5 | 10 | Remarks on cure |
|---|---|---|---|---|---|---|---|---|
| M1 | 0 | 4 | 1 | 0 | — | 3 | 3 | slightly wet at 5 kGy |
| M2 | 0 | 4 | 0 | 1 | — | 3 | 3 | just dry at 5 kGy |
| M3 | 4 | 0 | 1 | 0 | 2 | 1 | 1 | |
| M4 | 4 | 0 | 0 | 1 | — | 2 | 2 | dry at 5 kGy |
| M5 | 1 | 0 | 0 | 0 | 2 | 3 | 3 | |

TABLE A2

| Mix No. | Amount of S1 in D070 (%) | Comparitive Sheen Rub Mark 5 kGy | 10 kGy |
|---|---|---|---|
| M6 | 0.5 | = | + |
| M7 | 1 | = | = |
| M8 | 3 | + | + |

"=" indicates at least as good as control
"+" indicates better than control

TABLE A3

| Mix No. | Amount of S1 in mix (%) | Resin Type | present Amount | MEK Swab test | Dose to cure on Paper (kGy) |
|---|---|---|---|---|---|
| M9 | 0 | TMPTA | 100 | 22 | 5 |
| M10 | 0 | TPGDA | 100 | 12* | 15 |
| M11 | 3 | TMPTA | 97 | 22 | 5 |
| M12 | 100 | — | — | 147** | 5 |
| M13 | 75 | 3131 | 25 | 38 | 5 |
| M14 | 75 | 3104 | 25 | 26 | 5 |

*after 15 kGy dose
**swab started to be marked

TABLE A4

| Mix No. | Tin Compound S No. | Amount % | Resin Type | Amount % | Dose to cure on Paper (kGy) | MEK Swab Test |
|---|---|---|---|---|---|---|
| M15 | S2 | 10 | TPGDA | 90 | 15 | 9 |
| M16 | S2 | 14 | TMPTA | 86 | 5 | 11 |
| M17 | S2 | 5 | TMPTA | 95 | 5 | 22 |
| M18 | S5 | 100 | — | — | 5 | 200 |
| M19 | S7 | 10 | TPGDA | 90 | 15 | 6 |
| M20 | S7 | 10 | TMPTA | 90 | 5 | 10 |
| M21 | S3 | 50 | TPGDA | 50 | 15 | 8 |
| M22 | S3 | 50 | TMPTA | 50 | 15 | 9 |

TABLE A5

| Mix No. | Coating Composition | Acetone Rub Test 1.9 kGy | 3.8 kGy |
|---|---|---|---|
| M23 | TMPTA | —* | 3 |
| M24 | TPGDA | —* | 1 |
| M25 | S1 | 8–12 | 15–18 |
| M26 | S4 | 4 | 25 |
| M27 | S5 | 5–7 | — |
| M28 | S6 | 3–7 | — |
| M29 | S3 | 8 | 17–22 |

*not cured at 1.9 kGY

TABLE A6

| Mix No. | Tin Compound S No. | % | Other Nature | % | Acetone rub test |
|---|---|---|---|---|---|
| 30 | S1 | 90 | PE 55F | 10 | 20–25 |
| 31 | S1 | 80 | PE 55F | 20 | 35 |
| 32* | S1 | 86 | TiO₂ pigment | 14 | 20 |

*1 plain smoother bar plus 1 No. 6 bar was used to coat this mix.

TABLE A7

| Mix No. | Composition (S No.) | Acetone Rub Test 1.9 kGy | 3.8 kGy |
|---|---|---|---|
| M33 | S50 | — | 1 |
| M34 | S52 | — | 2 |
| M35 | S51 | — | 1 |
| M36 | S25 | 2–4 | 8–12 |
| M37 | S24 | — | 4 |
| M38 | S23 | — | 5 |
| M39 | S20 | — | 1 |

TABLE A8

| Mix No. | Coating Composition S No. | wt % | Other | wt % | Cure Dose kGy |
|---|---|---|---|---|---|
| M40 | S9 | 15 | EGMA | 85 | 5 |
| M41 | S1 | 100 | — | — | 5 |
| M42 | S1 | 83 | Carbon Black | 17 | 5 |
| M43 | S1 | 50 | PE55F | 50 | 5 |
| M44 | S1 | 70 | PE55F | 30 | 5 |
| M45 | S10 | 12 | EGMA | 88 | 5 |
| M46 | S11 | 15 | EGMA | 85 | 5 |
| M47 | S60 | 100 | — | — | 5 |
| M48 | S30 | 100 | — | — | 2.5 |
| M49 | S29 | 100 | — | — | 2.5 |
| M50 | S32 | 100 | — | — | 2.5 |
| M51 | S34 | 100 | — | — | 5 |
| M52 | S22 | 100 | — | — | 5 |
| M53 | S27 | 100 | — | — | 5 |
| M54 | S33 | 100 | — | — | 5 |
| M55 | S28 | 100 | — | — | 5 |
| M56 | S26 | 100 | — | — | 5 |
| M57 | S12 | 100 | — | — | 5 |

| Mix | Coating Composition | Cure Dose |
|---|---|---|
| M58 | S1 83 Iron oxide* 17 | 5 |

TABLE A9a

Dose = 2.5 kGy

| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
|---|---|---|---|---|---|---|---|---|---|
| M59 | — | TPGDA | 31.3 | 36 | 27 | 2-3 | 3 | 3 | 2H |
| M60 | — | HDDA | 17.4 | 32.5 | 8 | 2-3 | 2 | 2 | H |
| M61 | S1 | — | 21.4 | 226 | 21.5 | 5 | 5 | 4-5 | HB |
| M62 | S4 | — | 25.2 | 495 | 28 | 2 | 2-3 | 3 | H |
| M63 | S5 | — | 24.3 | 408 | 36 | 5 | 5 | 5 | H |
| M64 | S20 | — | — | — | 22.5 | 2 | 2 | 1 | H |
| M65 | S22 | — | 47.4 | 142.5 | — | — | — | — | — |
| M66 | S24 | — | 29.0 | >500 | 7 | 2 | 2 | 2 | H |
| M67 | S25 | — | 47.8 | >500 | 38.5 | 2 | 3 | 1 | H |
| M68 | S27 | — | 36.0 | >500 | 22.5 | 2 | 2 | 1 | H |
| M69 | S30 | — | 40.4 | >500 | — | — | — | — | — |
| M70 | S31 | — | 49.3 | 465 | — | — | — | — | — |

TABLE A9b

Dose = 5.0 kGy

| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
|---|---|---|---|---|---|---|---|---|---|
| M59 | — | TPGDA | 30.7 | 74.5 | 29.5 | 2 | 3 | 1 | 2H |
| M60 | — | HDDA | 18.8 | 55 | 53 | 2 | 4 | 2 | H |
| M61 | S1 | — | 28.0 | 261 | 28 | 5 | 5 | 4 | 2H |
| M62 | S4 | — | 30.6 | >500 | 20.5 | 3-4 | 5 | 3-4 | 2H |
| M63 | S5 | — | — | — | — | — | — | — | — |
| M64 | S20 | — | — | — | 24 | 1 | 2 | 2 | 2H |
| M65 | S22 | — | 41.4 | 111 | — | — | — | — | — |
| M66 | S24 | — | 38.8 | >500 | 14.5 | 1-2 | 1 | 2 | 2H |
| M67 | S25 | — | 49.7 | >500 | 22 | 1-2 | 1 | 2 | 3H |
| M68 | S27 | — | 41.6 | >500 | 24 | 1 | 2 | 2 | 2H |
| M69 | S30 | — | 53.4 | >500 | — | — | — | — | — |
| M70 | S31 | — | 54.2 | 67.5 | — | — | — | — | — |

TABLE A9c

Dose = 10 kGy

| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
|---|---|---|---|---|---|---|---|---|---|
| M59 | — | TPGDA | 22.3 | 53 | 20 | 1 | 2 | 1 | 2H |
| M60 | — | HDDA | 11.1 | 75 | 16 | 1 | 2 | 2 | 2H |
| M61 | S1 | — | 25.5 | >500 | 20 | 2-3 | 2 | 3-4 | 2H |
|  |  |  | 30.5 | >500 | 34 | 3-4 | 3 | 4 | H |
| M62 | S4 | — | 28.8 | >500 | 18.5 | 3-4 | 2 | 3 | 3H |
| M63 | S5 | — | 20.4 | 280 | 24.5 | 3-4 | 3-4 | 4 | H |
|  |  |  | 43.5 | >500 | 36 | 3-4 | 4 | 5 | 2H |
| M64 | S20 | — | — | — | 32 | 2 | 1-2 | 1 | 2H |
| M65 | S22 | — | 43.0 | >500 | — | — | — | — | — |
| M66 | S24 | — | 29.3 | >500 | 18 | 2 | 1 | 3 | 2H |
| M67 | S25 | — | 39.6 | >500 | 30 | 2 | 2-3 | 2 | 3H |
| M68 | S27 | — | 22.1 | >500 | 32 | 2 | 1-2 | 1 | 2H |
| M69 | S30 | — | 29.9 | >500 | — | — | — | — | — |
| M70 | S31 | — | 25.4 | >500 | — | — | — | — | — |

| No. | S No. | wt % | Other | wt % | kGy |
|---|---|---|---|---|---|

TABLE A9d

Dose = 20 kGy

| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
|---|---|---|---|---|---|---|---|---|---|
| M59 | — | TPGDA | 19.3 | 191 | 21 | 2-3 | 2-3 | 3 | 2H |
| M60 | — | HDDA | 9.97 | 500 | 8 | 1 | 1-2 | 1 | 2H |
| M61 | S1 | — | 29.2 | >500 | 36.5 | 3-4 | 3 | 3 | >3H |
| M62 | S4 | — | 19.3 | >500 | 35 | 2 | 2 | 2 | 2H |
| M63 | S5 | — | 46.7 | >500 | 17.5 | 5 | 5 | 5 | >3H |
| M64 | S20 | — | — | — | 29.5 | 2 | 1 | 1 | 3H |
| M65 | S22 | — | 39.4 | >500 | — | — | — | — | — |
|  |  |  | 44.4 | >500 |  |  |  |  |  |
| M66 | S24 | — | 20.2 | >500 | 13 | 1 | 1 | 1 | 3H |
| M67 | S25 | — | 33.2 | >500 | 31.5 | 1 | 1 | 1 | 3H |
| M68 | S27 | — | 22.2 | >500 | 29.5 | 2 | 1 | 1 | 3H |
| M69 | S30 | — | 50.4 | >500 | — | — | — | — | — |

TABLE A9d-continued

| | | | Dose = 20 kGy | | | | | |
|---|---|---|---|---|---|---|---|---|
| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
| M70 | S31 | — | 44.1 | >500 | — | — | — | — | — |

TABLE A9e

| | | | Dose = 40 kGy | | | | | |
|---|---|---|---|---|---|---|---|---|
| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
| M59 | — | TPGDA | 16.4 | 161.5 | 25.5 | 2 | 2 | 2-3 | 3H |
| M60 | — | HDDA | 9.9 | >500 | 29.5 | 2 | 2 | 1 | 2H |
| M61 | S1 | — | 29.6 | >500 | 21.5 | 3-4 | 2 | 2-3 | >3H |
| M62 | S4 | — | 16.8 | >500 | 15.5 | 2 | 1 | 2-3 | 2H |
| M63 | S5 | — | 33.9 | >500 | 12.5 | 4 | 5 | 4 | >3H |
| M64 | S20 | — | 39.7 | 32.5 | 30 | 1-2 | 2 | 1 | 3H |
| M65 | S22 | — | 40.3 | >500 | — | — | — | — | — |
| M66 | S24 | — | 22.2 | >500 | 24 | 2 | 1 | 1 | 3H |
| M67 | S25 | — | 29.2 | >500 | 41 | 1-2 | 2 | 1 | 3H |
| M68 | S27 | — | 18.8 | >500 | 30 | 1-2 | 2 | 1 | 3H |
| M69 | S30 | — | 45.2 | >500 | — | — | — | — | — |
| M70 | S31 | — | 56.3 | >500 | — | — | — | — | — |

TABLE A9f

| | | | Dose = 60 kGy | | | | | |
|---|---|---|---|---|---|---|---|---|
| Mix No. | S No. | Other Resin | Ct. Wt. gm$^{-2}$ | Acetone Rub Test | Abrasion Rub Test | Brittle-ness | Surface Adhesion | Cross Hatch | Pencil Hardness |
| M59 | — | TPGDA | 31.5 | >500 | 34.5 | 3-4 | 3-4 | 2-3 | >3H |
| M60 | — | HDDA | 19.4 | >500 | 24.5 | 3 | 3-4 | 3-4 | >3H |
| M61 | S1 | — | 26.3 | >500 | 27 | 2-3 | 2 | 3 | >3H |
| M62 | S4 | — | 27.6 | >500 | 36 | 3-4 | 2-3 | 3 | >3H |
| M63 | S5 | — | 30.5 | >500 | 22.5 | 3-4 | 2 | 4-5 | >3H |
| M64 | S20 | — | — | — | 24.5 | 1 | 1 | 1 | 3H |
| M65 | S22 | — | 40.1 | >500 | — | — | — | — | — |
| M66 | S24 | — | 42.9 | >500 | 21.5 | 3 | 1 | 1 | >3H |
| M67 | S25 | — | 41.0 | >500 | 50 | 1 | 2 | 1 | >3H |
| M68 | S27 | — | 17.9 | >500 | 24.5 | 1 | 1 | 1 | 3H |
| M69 | S30 | — | 41.4 | >500 | — | — | — | — | — |
| M70 | S31 | — | 45.3 | >500 | — | — | — | — | — |

TABLE A10

| M No. | S No. | Diluent Material | % | Dose kGy |
|---|---|---|---|---|
| M71 | S53 | — | — | 50 |
| M72 | S54 | — | — | 50 |
| M73 | S55 | — | — | 5 |
| M74 | S56 | — | — | 2.5 |
| M75 | S61 | — | — | 50 |
| M76 | S62 | — | — | 2.5 |
| M77 | S63 | — | — | 2.5 |
| M78 | S64 | TPGDA | 80 | 5 |
| M79 | S65 | TPGDA | 80 | 5 |
| M80 | S66 | TPGDA | 80 | 5 |
| M81 | S67 | — | — | 5 |

TABLE A11a

| | | | Dose = 2.5 kGy | | | | | |
|---|---|---|---|---|---|---|---|---|
| Mix No. | Compn. | Ct. Wt.* gm$^{-2}$ | Acetone | i-Propanol | Hexane | Abrasion Rub Test | Brittle-ness | Pencil Hardness |
| M82 | HDDA | 22.7 | 2.5 | 13 | 50 | 4.5 | 2-3 | H |
| M83 | TGPDA | 31.6 | 1 | 19 | 32.5 | 8.5 | 3 | 2H |
| M84 | S43 | 22.3 | 6 | 115 | >500 | 11 | 2-3 | 3H |
| M85 | S44 | 12.4 | 1 | 11 | 65 | 9 | 1 | 3H |
| M86 | S45 | — | 1 | 5 | 55 | — | 1 | 3H |
| M87 | S46 | — | 1 | 22.5 | 205 | — | 1-2 | 4H |
| M88 | S47 | 44.5 | 1 | 15.5 | 52.5 | 5 | 1 | 4H |
| M89 | S48 | — | — | — | — | — | 1 | 3H |
| M90 | S49 | 24.0 | 1 | 10 | 52.5 | 9 | 1 | 2H |

*mean of 2

TABLE A11b

| Mix No. | Compn. | Ct. Wt.* gm$^{-2}$ | Dose = 5.0 kGy Rub Resistance Acetone | i-Propanol | Hexane | Abrasion Rub Test | Brittleness | Pencil Hardness |
|---|---|---|---|---|---|---|---|---|
| M82 | HDDA | 11.9 | 41.5 | 280 | >500 | 6.5 | 2–3 | 2H |
| M83 | TGPDA | 18.7 | 51 | 380 | >500 | 17 | 2–3 | 3H |
| M84 | S43 | 23.3 | 13 | 115 | >500 | 21 | 3 | 4H |
| M85 | S44 | 9.8 | 1.5 | 18 | 95 | 9.5 | 1 | >4H |
| M86 | S45 | 14.5 | 1 | 8 | 27 | 16 | 1–2 | >4H |
| M87 | S46 | 19.8 | 1.5 | 27.5 | 360 | 13 | 1 | 4H |
| M88 | S47 | 10.3 | 1 | 21.5 | 102.5 | 7 | 1 | 4H |
| M89 | S48 | 12.7 | 1 | 8 | 31 | 9 | 2 | >4H |
| M90 | S49 | 14.5 | 1.5 | 8 | 36 | 10 | 1 | >4H |

*mean of 2

TABLE A11c

| Mix No. | Compn. | Ct. Wt.* gm$^{-2}$ | Dose = 10 kGy Rub Resistance Acetone | i-Propanol | Hexane | Abrasion Rub Test | Brittleness | Pencil Hardness |
|---|---|---|---|---|---|---|---|---|
| M82 | HDDA | — | — | — | — | — | — | — |
| M83 | TGPDA | 20.8 | 47.5 | 145 | >500 | 20 | 3 | 3H |
| M84 | S43 | 21.0 | 35 | 120 | >500 | 23 | 2–3 | >4H |
| M85 | S44 | 8.7 | 1.5 | 8.5 | 105 | 12.5 | 1–2 | >4H |
| M86 | S45 | 10.4 | 1 | 11 | 76 | 13 | 1 | >4H |
| M87 | S46 | 13.2 | 3 | 16 | 330 | 17.5 | 1–2 | >4H |
| M88 | S47 | 10.4 | 1 | 36 | 122 | 10 | 1 | >4H |
| M89 | S48 | 21.4 | 2.5 | 17.5 | 95 | 19.5 | 1–2 | >4H |
| M90 | S49 | 17.7 | 2 | 25.5 | 106 | 20 | 2 | >4H |

*mean of 2

TABLE A12

| Mix No. | Ct. Wt. gm$^{-2}$ | Dose kGy | Acetone Rub Test | Brittleness | Surface Adhesion | Cross Hatch | Pencil Hardness |
|---|---|---|---|---|---|---|---|
| M91 | 40.4 | 2.5 | 7.5 | 2 | 1 | 1 | HB |
|  | 43.0 | 5.0 | 39 | 1 | 1–2 | 1 | 2H |
|  | 27.3 | 10 | 52.5 | 2–3 | 2–3 | 3 | 2H |
|  | 41.6 | 20 | 172 | 2–3 | 2 | 3 | 3H |
| M92 | 51.6 | 1.0 | >500 | 1–2 | 1 | 2 | 4H |
|  | 57.8 | 2.5 | >500 | 1 | 1 | 1 | 4H |
|  | 46.6 | 5.0 | >500 | 1 | 1 | 1 | 4H |

TABLE A13

| M No. | S No. | Ct. Wt gm$^{-2}$ | Dose kGy | Acetone Rub | Dry Abrasion | Brittleness | Surface Adhesion | Cross Hatch |
|---|---|---|---|---|---|---|---|---|
| M93 | S4 | 43.3 | 1.0 | 18 | 5 | 5 | 5 | 5 |
| M94 | S8 | 40.1 | 2.5 | 42 | 8 | 5 | 5 | 5 |
|  |  | 15.9 | 5.0 | 15 | 2 | 3–4 | 4–5 | 4 |
| M95 | S25 | 21.9 | 1.0 | 35 | 9 | 3 | 0 | 1 |
|  |  | 27.4 | 5.0 | >500 | 22 | 2–3 | 2 | 1 |
| M96 | S24 | 56.7 | 1.0 | 17 | 3 | 3 | 4 | 5 |
| M97 | S29 | 44.8 | 1.0 | 14 | 4 | 2 | 2 | 3 |
| M98 | S27 | 28.1 | 1.0 | 20 | 5 | 3 | 3 | 4 |
| M99 | S31 | 28.4 | 2.5 | 30 | 5 | 3 | 2 | 3 |
|  |  | 29.9 | 5.0 | 160 | 20 | 2–3 | 2 | 3 |
| M100 | S39 | 26.7 | 5.0 | 18 | 4 | 3 | 2 | 3 |
| M101 | S40 | 29.9 | 2.5 | 16 | 4 | 2 | 1–2 | 1 |
|  |  | 14.7 | 5.0 | 11 | 1 | 2 | 1–2 | 2 |
| M102 | S37 | 21.5 | 2.5 | 15 | 4 | 3 | 2 | 2 |
|  |  | 20.5 | 5.0 | 20 | 3 | 3 | 1 | 2–3 |
| M103 | S35 | 24.3 | 5.0 | 120 | 10 | 3 | 2 | 2 |

We claim:

1. A method of making a substrate having on at least one surface thereof a cured polymeric coating, which method comprises providing on the substrate a layer of a curable coating composition including at least one compound of the formula:

$$R^1_m MR^2_n \qquad (I)$$

where each $R^1$ is independently an alkyl group, optionally substituted with one or more alkoxy or polyoxyalkylene groups; an alkenyl group; a cycloalkyl group; an aralkyl group; or an aryl group which is optionally substituted with one or more alkyl or alkoxy groups or halogen atoms;

each $R^2$ is independently a group of the formula:

—O—X—CO—CH=CHR$^3$ where

X is selected from the group consisting of a direct bond;

a group of the formula: —(CH$_2$CHR$^4$O)$_p$,
where $R^4$ is a hydrogen atom or a $C_1$ to $C_4$ alkyl group, and p is an integer from 1 to 3;

a $C_2$ to $C_{16}$ alkylene group; and a group of the formula:

—[(CH$_2$)$_r$CO$_2$]$_s$—(CH$_2$CHR$^4$O)$_p$—, where $R^4$ and p are as defined above, r is an integer from 3 to 8, and s is an integer from 1 to 3;

$R^3$ is a hydrogen atom or a methyl group;

n is an integer from 1 to 4;

m is (4−n); and

M is a tin or silicon atom to a Ti—(O—)$_m$, Zr—(O—)$_m$ or Si—(O)$_m$ group; and curing the coating by exposing it to electron beam radiation.

2. A method as claimed in claim 1 wherein each $R^1$ is independently a $C_1$ to $C_{20}$ alkyl group, a $C_2$ to $C_4$ alkenyl group, a $C_5$ to $C_7$ cycloalkyl group, a benzyl, phenethyl or diphenylmethy group or a phenyl or naphthyl group which is optionally substituted with one or more $C_1$ to $C_5$ alkyl or $C_1$ to $C_5$ alkoxy groups or halogen atoms.

3. A method as claimed in either claim 1 or claim 2 wherein X is a direct bond, a —(CH$_2$CH$_2$O)— group, a $C_2$ to $C_8$ alkylene group or a —[(CH$_2$)$_5$CO$_2$]$_2$—(CH$_2$CH$_2$O)— group.

4. A method as claimed in claim 1 wherein M is a silicon or tin atom, each $R^3$ and $R^4$, when present, is a hydrogen atom and n is 2 or 3.

5. A method as claimed in claim 1 wherein the layer of a curable coating composition includes at least one tin compound of the formula:

$$R^1{}_mSn(-O_2C.CH=CH_2)_n \quad (Ia)$$

6. A method as claimed in claim 1, wherein the layer of curable coating composition includes at least one silicon compound of the formula:

$$R^1{}_mSi(-O-X^1-COCH=CH_2)_n \quad (Ib)$$

wherein $X^1$ is X, but is not a direct bond.

7. A method as claimed in claim 6 wherein a mixture of at least one compound of the general formula (Ia) and at least one compound of the general formula (b) is used wherein the formula (Ia) is as follows:

$$R^1{}_mSn(-O_2C.CH=CH_2)_n \text{ (Ia)}.$$

8. A method as claimed in claim 1 wherein the substrate is of paper.

9. A plastics laminate or furniture foil made by the method claimed in claim 1.

10. A method of making a substrate having on at least one surface thereof a cured polymeric coating, which method comprises providing on the substrate a layer of a curable coating composition including at least one compound of the formula:

$$R^1{}_mMR^2{}_n \quad (I)$$

where each $R^1$ is independently an alkyl group, optionally substituted with one or more alkoxy or polyoxyalkylene groups; an alkenyl group; a cycloalkyl group; an aralkyl group; or an aryl group which is optionally substituted with one or more alkyl or alkoxy groups or halogen atoms;

each $R^2$ is independently a group of the formula:

—O—X—CO—CH=CHR$^3$ where

X is selected from the group consisting of a direct bond;

a group of the formula: —(CH$_2$CHR$^4$O)$_p$, wherein $R^4$ is a hydrogen atom or a $C_1$ to $C_4$ alkyl group, and p is an integer from 1 to 3;

a $C_2$ to $C_{16}$ alkylene group; and a group of the formula:

—[(CH$_2$)$_r$CO$_2$]$_s$—(CH$_2$CHR$^4$O)$_p$—, where $R^4$ and p are as defined above, r is an integer from 3 to 8, and s is an integer from 1 to 3;

$R^3$ is a hydrogen atom or a methyl group;

n is an integer from 1 to 4;

m is (4−n); and

M is a tin or silicon atom; and curing the coating by exposing it to electron beam radiation.

11. A method as claimed in claim 10 wherein the substrate is of paper.

12. A plastics laminate or furniture foil made by the method claimed in claim 10.

* * * * *